US012717497B2

(12) United States Patent
Li et al.

(10) Patent No.: US 12,717,497 B2
(45) Date of Patent: Aug. 25, 2026

(54) HANDLING READ-VERIFY FAILURE IN ZONE MEMORY SYSTEM

(71) Applicant: Micron Technology, Inc., Boise, ID (US)

(72) Inventors: Juane Li, Milpitas, CA (US); Amit Bhardwaj, Longmont, CO (US); Michael Winterfeld, Firestone, CO (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/788,487

(22) Filed: Jul. 30, 2024

(65) Prior Publication Data

US 2026/0037140 A1 Feb. 5, 2026

(51) Int. Cl.
*G06F 12/00* (2006.01)
*G06F 3/06* (2006.01)

(52) U.S. Cl.
CPC .......... *G06F 3/0619* (2013.01); *G06F 3/0647* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 2017/0169034 A1 | 6/2017 | Shrivastava et al. | |
| 2019/0332544 A1 | 10/2019 | Jia et al. | |
| 2022/0139466 A1* | 5/2022 | Gorobets | G11C 11/5628 365/189.011 |
| 2022/0319622 A1 | 10/2022 | Bhardwaj | |
| 2024/0061597 A1* | 2/2024 | Lam | G06F 3/064 |
| 2024/0143170 A1* | 5/2024 | Lakshmi | G06F 3/0679 |
| 2024/0220359 A1* | 7/2024 | Inbar | G06F 11/076 |
| 2026/0037369 A1 | 2/2026 | Li et al. | |
| 2026/0037399 A1 | 2/2026 | Li et al. | |

FOREIGN PATENT DOCUMENTS

CN 101356510 A 1/2009

* cited by examiner

*Primary Examiner* — Daniel D Tsui
(74) *Attorney, Agent, or Firm* — Schwegman Lundberg & Woessner, P.A.

(57) ABSTRACT

Various embodiments provide handling block read-verify failure in a memory sub-system that supports zones. In particular, some embodiments described herein handle block read-verify failure during migration (e.g., copyback) of data from one or more cache blocks to one or more non-cache blocks of a zone on a memory device on a memory sub-system, during non-cache block (e.g., QLC non-cache block) refresh, or both.

20 Claims, 8 Drawing Sheets

HANDLING READ-VERIFY FAILURE IN ZONE MEMORY SYSTEM

TECHNICAL FIELD

Embodiments of the disclosure relate generally to memory devices and, more specifically, to handling block read-verify failure in a memory system or sub-system that supports zones.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
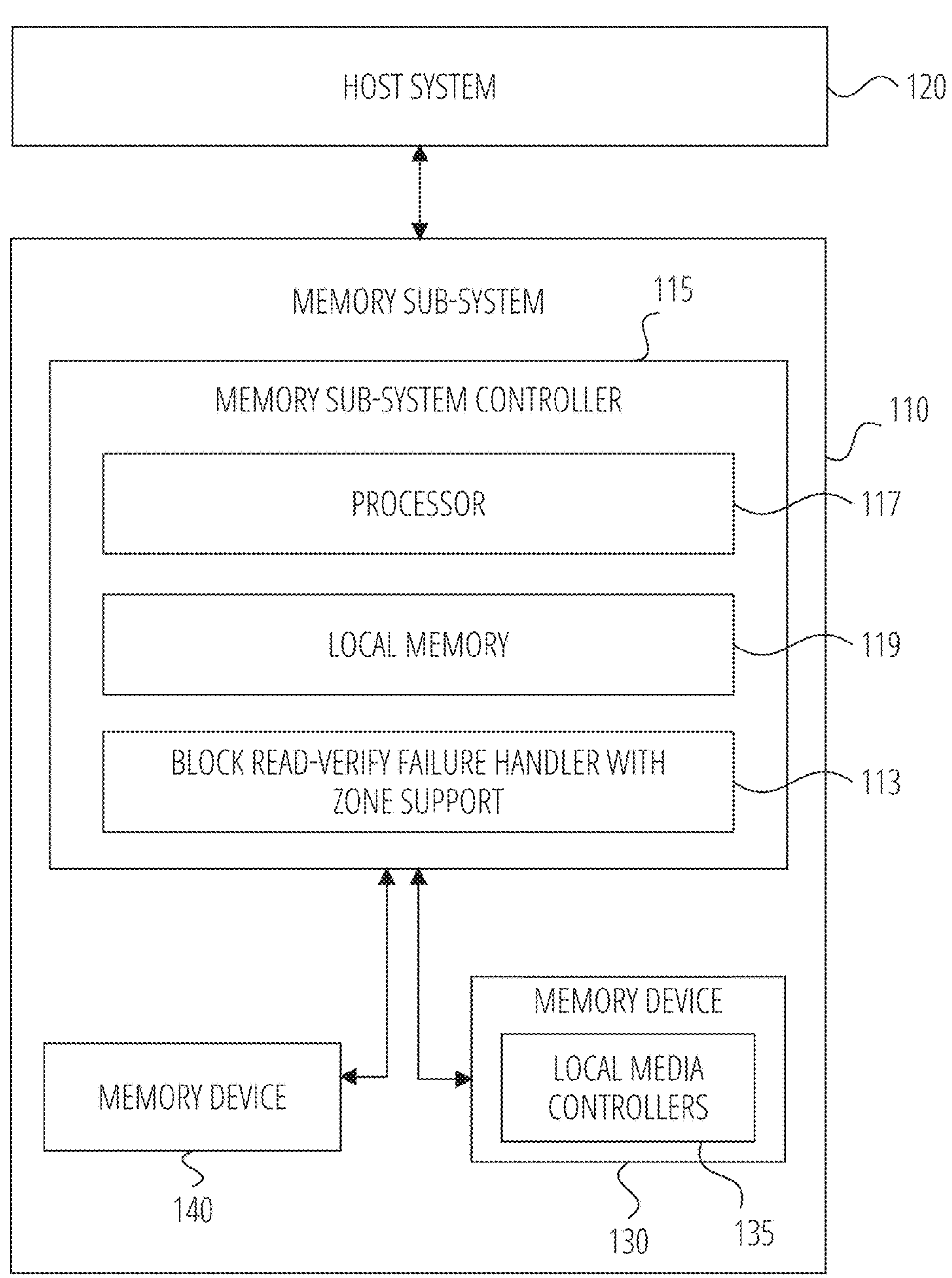
FIG. 1 is a block diagram illustrating an example computing system that includes a memory sub-system, in accordance with some embodiments of the present disclosure.

Aspects of the present disclosure are directed to handling block read-verify failure in a memory sub-system that supports zones (hereafter, a zone memory sub-system). A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can send access requests to the memory sub-system, such as to store data at the memory sub-system and to read data from the memory sub-system.

The host system can send access requests (e.g., write command, read command) to the memory sub-system, such as to store data on a memory device at the memory sub-system, read data from the memory device on the memory sub-system, or write/read constructs (e.g., such as submission and completion queues) with respect to a memory device on the memory sub-system. The data to be read or written, as specified by a host request, is hereinafter referred to as “host data” or “user data.”

The data can be stored in the memory sub-system according to zones. Such a memory sub-system can be referred to as a zone-based memory sub-system or a zone memory sub-system. As used herein, a zone can comprise a contiguous range of logical addresses (e.g., logical block addresses) that is managed within a memory sub-system as a single unit. In comparison to block level data management, a zone-based memory sub-system can use zones to organize and manage data as larger, logically contiguous memory regions, which can allow for more efficient use of storage space on the memory sub-system and reduce write amplification of blocks. Each zone can be managed independently and have an associated state machine maintained by the memory sub-system. The state machine of an individual zone can comprise a set of states for the individual zone, where each state in the set of states (e.g., in combination with and a zone type of the individual zone) can define operational characteristics of the individual zone. Example zone states for an individual zone can include, without limitation: empty (e.g., ZSE: Empty); implicitly opened (e.g., ZSIO: Implicitly Opened); explicitly opened (e.g., ZSEO: Explicitly Opened); closed (e.g., ZSC: Closed); full (e.g., ZSF: Full); read only (e.g., ZSRO: Read Only); or offline (e.g., ZSO: Offline). Various zones can be defined in the memory sub-system, each of which can be uniquely associated with a particular set of user data or an application. For example, a first zone can be associated with a first application (or user data identified as received from the first application) and a second zone can be associated with a second application. Host data or user data received from the first application can be stored by the memory sub-system in the first zone. The zones can be of equal or unequal size and can span the size of a single block on a die, multiple blocks on the die, an entire die or a set of dies of the memory sub-system. For example, each zone can span a respective set of blocks in a corresponding die or set of die rather than sequentially across a row of blocks, and a particular application can be associated with a given zone that spans a single die. User or host data associated with that application can be stored in that given zone on the single die. A zone can be defined in a memory sub-system in accordance with a NVM EXPRESS (NVMe) specification (e.g., Zone Namespaces (ZNS) specification from NVMe). For instance, a zone can be defined in a memory sub-system by one or more NVMe commands issued to the memory sub-system.

A host request can include logical address information (e.g., logical block address (LBA), namespace) for the host data, which is the location the host system associates with the host data and a particular zone in which to store or access the host data. The logical address information (e.g., LBA, namespace) can be part of metadata for the host data. Metadata can also include error handling data (e.g., error-correcting code (ECC) code word, parity code), data version (e.g., used to distinguish age of data written), valid bitmap (which LBAs or logical transfer units contain valid data), and so forth.

The memory sub-system can initiate media management operations, such as a write operation, on host data that is stored on a memory device. For example, firmware of the memory sub-system may re-write previously written host data from a location of a memory device to a new location as part of garbage collection management operations. The data that is re-written, for example as initiated by the firmware, is hereinafter referred to as “garbage collection data.”

“User data” hereinafter generally refers to host data and garbage collection data. “System data” hereinafter refers to data that is created and/or maintained by the memory sub-system for performing operations in response to host requests and for media management. Examples of system data include, and are not limited to, system tables (e.g., logical-to-physical memory address mapping table (also referred to herein as a L2P table), data from logging, scratch pad data, and so forth).

A memory device can be a non-volatile memory device. A non-volatile memory device is a package of one or more dies. Each die can be comprised of one or more planes. For some types of non-volatile memory devices (e.g., AND-type devices), each plane comprises a set of physical blocks. For some memory devices, blocks are the smallest area that can be erased. Each block comprises a set of pages. Each page comprises a set of memory cells, which store bits of data. The memory devices can be raw memory devices (e.g., NAND), which are managed externally, for example, by an external controller. The memory devices can be managed memory devices (e.g., managed NAND), which are a raw memory device combined with a local embedded controller for memory management within the same memory device package. The memory device can be divided into one or more zones where each zone is associated with a different set of host data or user data or application data.

Certain memory devices, such as NAND-type memory devices, comprise one or more blocks, (e.g., multiple blocks), with each of those blocks comprising multiple memory cells. For instance, a memory device can comprise multiple pages (also referred to as wordlines), with each page comprising a subset of memory cells of the memory device. A threshold voltage (VT) of a memory cell (of a block) can be the voltage at which the floating gate (e.g., NAND transistor), implementing the memory cell, turns on and conducts (e.g., to a bit line coupled to the memory cell). Generally, writing data to such memory devices involves programming (by way of a program operation) the memory devices at the page level of a block, and erasing data from such memory devices involves erasing the memory devices at the block level (e.g., page level erasure of data is not possible).

A memory device can comprise one or more cache blocks and one or more non-cache blocks, where data written to the memory device is first written to one or more cache blocks, which can facilitate faster write performance; and data stored on the cache blocks can eventually be moved (e.g., copied) to one or more non-cache blocks at another time (e.g., a time when the memory device is idle), which can facilitate higher storage capacity on the memory device. A cache block can comprise a single-level cell (SLC) block that comprises multiple SLCs, and a non-cache block can comprise a multiple-layer cell (MLC) block that comprises multiple MLCs, a triple-layer cell (TLC) block that comprises multiple TLCs, or a quad-level cell (QLC) block that comprises QLCs. Writing first to one or more SLCs blocks can be referred to as SLC write caching or SLC caching (also referred to as buffering in SLC mode). Generally, when using traditional full SLC caching, an SLC block is released of data after data is moved from the SLC block to a non-cache block (e.g., QLC block) and the non-cache block is verified to be free of errors.

Conventional zone memory sub-systems can use full SLC-block caching (also referred to as SLC caching), where data is buffered (e.g., written first) on SLC cache blocks and the buffered data is released from the SLC cache block after the buffered data is written to non-cache blocks (e.g., MLC, TLC, QLC blocks) and the written data is verified to be free of defects on the non-cache blocks. In some implementations where the non-cache blocks are QLC blocks, four SLC blocks could be utilized per an open QLC block. For instance, where a memory sub-system has sixteen open QLC blocks per NAND-device plane, sixty-four SLC cache blocks would be used per a plane.

Figure 2A:
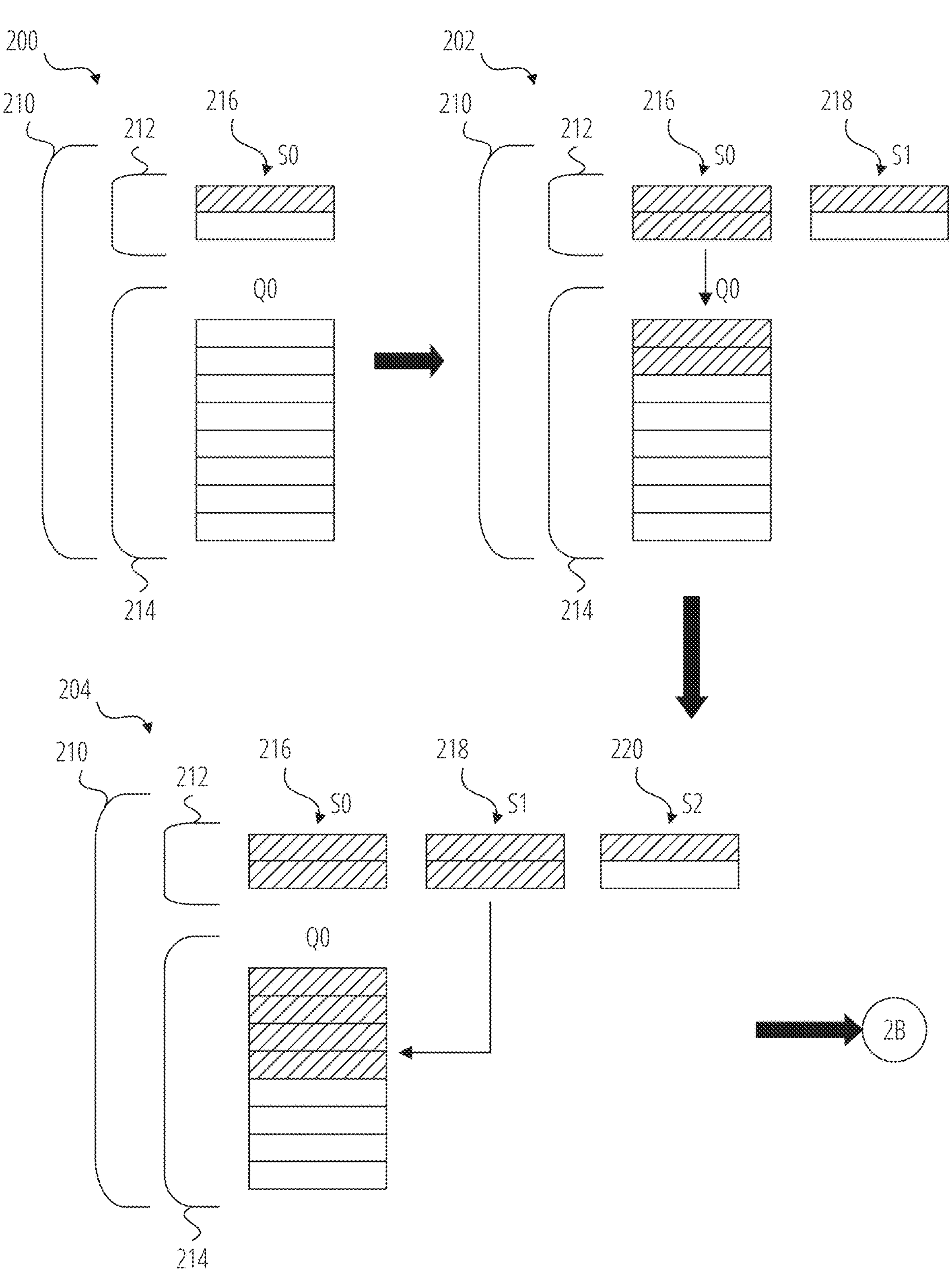
FIG. 2A and FIG. 2B are block diagrams illustrating operations of an example block caching architecture on a zone-based memory sub-system, in accordance with some embodiments of the present disclosure.
Figure 2B:
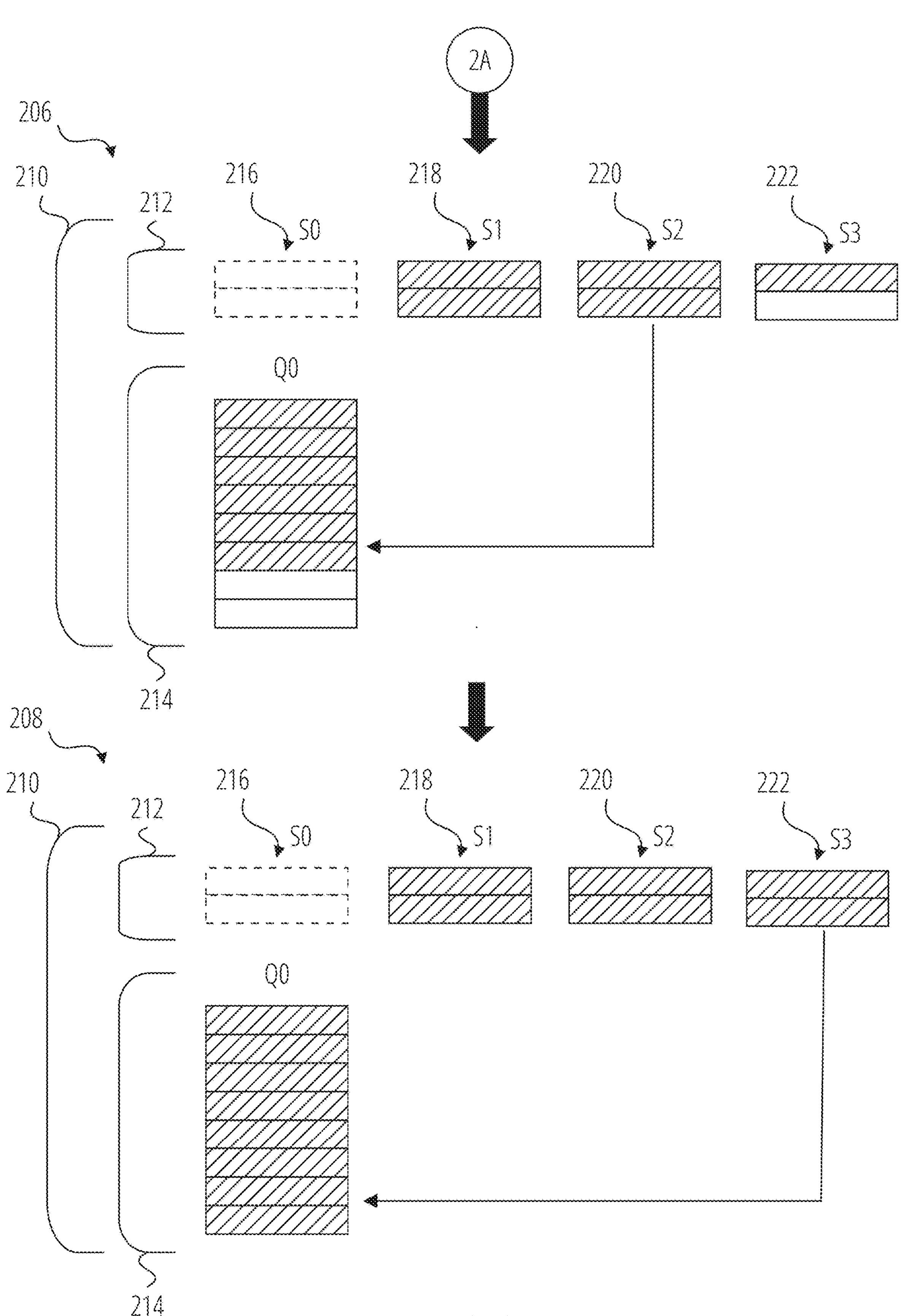

For a 3SLC/1QLC (or 3S/1Q) architecture implemented on a zone-based memory sub-system, a single QLC blockset (e.g., comprising two QLC blocks) is mapped to a zone and up to three SLC blocksets are temporarily mapped to the zone to facilitate SLC-block caching with respect to the single QLC blockset. Operations of an example block caching architecture (e.g., 3S/1Q architecture) are illustrated with respect to FIG. 2A and FIG. 2B. In FIG. 2A and FIG. 2B, a zone 210 comprises one or more SLC blocksets 212 and a QLC blockset 214 (Q0). Referring now to FIG. 2A, when the zone 210 is open, a single, first SLC blockset 216 (S0) is allocated and mapped to the zone 210, and the QLC blockset 214 is allocated and mapped to the 210. During stage 200, as a host system starts writing data to the zone 210, data is buffered in the first SLC blockset 216 of the one or more SLC blocksets 212 and not written (copied back) to the QLC blockset 214 until there is enough data in the first SLC blockset 216. At stage 202, as the host system continues to write data to the zone 210 and the first SLC blockset 216 becomes full, a second SLC blockset 218 (S1) is allocated and mapped to the zone 210, data begins to be written to the second SLC blockset 218, and data stored (e.g., cached) in the first SLC blockset 216 is written (or copied back) to the QLC blockset 214. The first SLC blockset 216 is not released (e.g., unmapped or disassociated) from the zone 210 during stage 202. Thereafter at stage 204, as the host system continues to write data to the zone 210 and the second SLC blockset 218 becomes full, a third SLC blockset 220 (S2) is allocated and mapped to the zone 210, data begins to be written to the third SLC blockset 220, and data stored (e.g., cached) in the second SLC blockset 218 is written (or copied back) to the QLC blockset 214. The second SLC blockset 218 is not released (e.g., unmapped or disassociated) from the zone 210 during stage 204.

Referring now to FIG. 2B, at stage 206, as the host system continues to write data to the zone 210 and the fourth SLC blockset 222 becomes full, a fourth SLC blockset 222 (S3) is allocated and mapped to the zone 210, data begins to be written to the fourth SLC blockset 222, and data stored (e.g., cached) in the third SLC blockset 220 is written (or copied back) to the QLC blockset 214. If during stage 206, the fourth SLC blockset 222 is filled to a certain percentage, a read-verify operation is performed on at least a portion (e.g., ¼) of the QLC blockset 214 to which data from the first SLC blockset 216 was written (e.g., copied back). During a read-verify operation on a block, data is read from a block and considered verified if the read data can be successfully decoded. If the read-verify operation performed on at least the portion (e.g., ¼) of the QLC blockset 214 results in a successful verification, the first SLC blockset 216 can be released (e.g., unmapped or disassociated) from the zone 210 (as shown in stage 206), thereby enabling the first SLC blockset 216 to be reallocated for reuse (e.g., different use). If, however, the read-verify operation performed on at least the portion (e.g., ¼) of the QLC blockset 214 does not result in a successful verification, the first SLC blockset 216 is not released (e.g., unmapped or disassociated) from the zone 210 and a memory sub-system would need to handle the error of the unsuccessful verification to ensure data integrity of the zone 210.

During stage 208, as the host system continues to write data to the zone 210 and the fourth SLC blockset 222 becomes full, data stored (e.g., cached) in the fourth SLC blockset 222 is written (or copied back) to the QLC blockset 214. Additionally, during stage 208, a read-verify operation is performed on remaining portions (e.g., ¾) of the QLC blockset 214 to which data from the second SLC blockset 218, the third SLC blockset 220, and the fourth SLC blockset 222 was written (e.g., copied back). If the read-verify operation performed on the remaining portions (e.g., ¾) of the QLC blockset 214 results in a successful verification, the second SLC blockset 218, the third SLC blockset 220, and the fourth SLC blockset 222 can be released (e.g., unmapped or disassociated) from the zone 210 (as shown in stage 206), thereby enabling each of the second SLC blockset 218, the third SLC blockset 220, and the fourth SLC blockset 222 to be reallocated for reuse (e.g., different use). If, however, the read-verify operation performed on the remaining portions (e.g., ¾) of the QLC blockset 214 does not result in a successful verification, the second SLC blockset 218, the third SLC blockset 220, and the fourth SLC blockset 222 are not released (e.g., unmapped or disassociated) from the zone 210 and a memory sub-system would need to handle the error of the unsuccessful verification(s) to ensure data integrity of the zone 210.

While the 3S/1Q architecture and similar architectures, such as 6SLC/2QLC (or 6S/1Q), offer a balanced approach to data performance and storage efficiency on a memory sub-system, it introduces complexities in data management, especially during the migration phases. Handling programming and reading of cache and non-cache blocks effectively is crucial, as failures in these operations can lead to data loss or corruption. For example, a read-verify failure can occur while a data is being migrated from one or more pages of one or more cache blocks (e.g., SLC cache blocks) to one or more non-cache blocks. It is possible that a program operation returns a good status but immediately suffers a read failure. In order to catch silent program failures and overcome reliability concerns of non-cache blocks (e.g., QLC non-cache blocks), a post-read-verify operation can be performed in a memory sub-system. Generally, a read-verify operation is performed on a page of a block (e.g., non-cache block) after a program operation (e.g., comprising fine mode programming) is performed on the page of the one or more blocks, where the read-verify operation comprises applying a read voltage to a wordline corresponding to the page (where the wordline is connected to multiple memory cells of the page), sensing the current or voltage level of each memory cell to determine its threshold voltage, comparing the sensed threshold with the expected threshold voltage range that represents the desired data state, and if the sensed threshold voltage falls within the acceptable range for the target data state, the memory cell is considered correctly programmed (e.g., verified). If not, the page can be considered a read-verify failed (RVF) page, which can affect the zone of the memory sub-system.

Various embodiments described herein provide for handling block read-verify failure in a memory sub-system that supports zones. In particular, some embodiments described herein handle block read-verify failure during migration (e.g., copyback) of data from one or more cache blocks to one or more non-cache blocks of a zone on a memory device on a memory sub-system, during non-cache block (e.g., QLC non-cache block) refresh, or both.

The memory sub-system of some embodiments provides enhanced data integrity (e.g., by handling silent program failures and providing better Uncorrectable Bit Error Rate (UBER)), and reduced downtime (e.g., quick recovery from read-verify failures, thereby enhancing overall reliability and user experience). Various embodiments provide read-verify failure handling with minimal impact on quality-of-service (QOS). The memory sub-system of some embodiments can enhance data integrity and system reliability (e.g., in solid-state drives (SSDs)) using a zone architecture (e.g., ZNS architecture), such as 3S/1Q architecture or the like. Additionally, the memory sub-system of some embodiments can incorporate advanced mechanisms for handling read-verify failures in both cache and non-cache blocksets, ensuring robust data management and recovery processes. Specifically, the memory sub-system of some embodiments is structured around the use of SLC cache blocks and QLC non-cache blocks, organized into zones, where zone data integrity on read-verify failure (e.g., during the SLC→QLC and QLC→QLC data movement) can be maintained. Each zone can be mapped to specific blocksets, with multiple SLC blocksets of a single zone serving as a high-speed cache and a single QLC blocksets of the single zone being used for long-term data storage. This configuration can leverage the fast data access and data write capabilities of SLC blocks while benefiting from the high-density data storage and cost-effectiveness of QLC blocks.

According to some embodiments, a memory sub-system handles read-verify failure (RVF) during a SLC to QLC migration (e.g., copyback) process in the memory sub-system (or during a refresh of a QLC non-cache block in the memory sub-system). Upon detection of a RVF, the affected zone can be moved to a read-only state. A new QLC blockset can then be allocated on the same planeset, if possible, and an Error QLC block refresh can be initiated, which can involve transferring data from the SLC blockset to the QLC blockset. The SLC to QLC migration process can be restarted to the new QLC blockset unless the SLC blocksets have already been released; otherwise, stored data is moved from the problematic QLC blockset to the new QLC blockset. Further checks, such as 1H1S decoding of the page reported with RVF, can be performed on the RVF QLC blockset. If decoding fails, the RVF QLC blockset can be marked as bad (e.g., a Grown Bad Block (GBB)) and retired. If decoding passes, the RVF QLC blockset can be moved to a garbage collection pool to enable the reuse of the RVF QLC blockset. Additionally, an empty zone can be taken offline to compensate for the capacity loss if the RVF QLC blockset is retired.

While various embodiments are described herein with respect to a 3S/1Q architecture, various embodiments can be adapted to be implemented with respect to other (e.g., similar) architectures, such as a 6S/1Q architecture.

As used herein, a planeset can comprise two or more planes of a memory die (e.g., NAND-type memory die), which can be part of a memory device (e.g., a NAND-type memory device). For instance, a planset can comprise plane0 and plane1 of a memory die, and a planset1 can comprise plane 2 and plane 3 of the memory die. A blockset can comprise one or more blocks of a memory device (e.g., a NAND-type memory device). For example, a blockset can comprise multiple blocks of a memory device (e.g., a NAND-type memory device) from different planesets (e.g., two blocks-one block from planeset0 and another block from planeset1). A SLC blockset can comprise one or more SLC blocks of a memory device (e.g., a NAND-type memory device), and a QLC blockset can comprise one or more QLC blocks of a memory device (e.g., a NAND-type memory device) of a memory sub-system. One or more SLC blocksets can be used for SLC caching on a memory device (e.g., a NAND-type memory device) of a memory sub-system.

As used herein, an erase status failure (ESF) can refer to a failure to erase a block (e.g., SLC block) on a memory device (e.g., a NAND-type memory device). A program status failure (PSF) or program failure (PF) can refer to a failure to program a block (e.g., SLC block) on a memory device (e.g., a NAND-type memory device) with data (e.g., write data to the NAND-type memory device). A grown bad block (GBB) can refer to a block of a memory device (e.g., a NAND-type memory device) that is marked as bad (e.g., unusable or unavailable) during operation of the memory device. An uncorrectable error (UECC) can refer to an error when reading data from a block of a memory device (e.g., a NAND-type memory device), where the error cannot be corrected by an error correction mechanism (e.g., error correction parity).

As used herein, a zone can comprise a contiguous range of logical addresses (e.g., logical block addresses) that is managed within a memory sub-system as a single unit. For example, a zone can be mapped to one or more blocksets. Once a zone is marked as finished by a controller (e.g., marked as zone finished by controller (ZFC)), the controller of a memory sub-system can prevent data from being written to the zone, but does not prevent data from being read from, the zone.

Disclosed herein are some examples of handling block read-verify failure in a memory sub-system that supports zones, as described herein.

FIG. 1 illustrates an example computing system 100 that includes a memory sub-system 110, in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, a secure digital (SD) card, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-systems 110. FIG. 1 illustrates one example of a host system 120 coupled to one memory sub-system 110. As used herein, “coupled to” or “coupled with” generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., NVDIMM controller), and a storage protocol controller (e.g., a peripheral component interconnect express (PCIe) controller, serial advanced technology attachment (SATA) controller). The host system 120 uses the memory sub-system 110, for example, to write data to the memory sub-system 110 and read data from the memory sub-system 110.

The host system 120 can include or be coupled to the memory sub-system 110 so that the host system 120 can read data from or write data to the memory sub-system 110. The host system 120 can be coupled to the memory sub-system 110 via a physical host interface. Examples of a physical host interface include, but are not limited to, a serial advanced technology attachment (SATA) interface, a peripheral component interconnect express (PCIe) interface, a compute express link (CXL) interface, a universal serial bus (USB) interface, a Fibre Channel interface, a Serial Attached SCSI (SAS) interface, etc. The physical host interface can be used to transmit data between the host system 120 and the memory sub-system 110. The host system 120 can further utilize an NVM EXPRESS (NVMe) interface to access the memory devices 130, 140 when the memory sub-system 110 is coupled with the host system 120 by the PCIe or CXL interface. The physical host interface can provide an interface for passing control, address, data, and other signals between the memory sub-system 110 and the host system 120.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a NAND type flash memory and write-in-place memory, such as a three-dimensional (3D) cross-point memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional (2D) NAND and 3D NAND.

Each of the memory devices 130, 140 can include one or more arrays of memory cells. One type of memory cell, for example, SLCs, can store one bit per cell. Other types of memory cells, such as MLCs, TLCs, QLCs, and penta-level cells (PLCs), can store multiple bits per cell. In some embodiments, each of the memory devices 130, 140 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130, 140 can be grouped as pages that can refer to a logical unit of the memory device used to store data. With some types of memory (e.g., NAND), pages can be grouped to form blocks. As used herein, a block comprising SLCs can be referred to as a SLC block, a block comprising MLCs can be referred to as an MLC block, a block comprising TLCs can be referred to as a TLC block, and a block comprising QLCs can be referred to as a QLC block.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide-based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide-based RRAM (OxRAM), negative-or (NOR) flash memory, and electrically erasable programmable read-only memory (EEPROM).

A memory sub-system controller 115 (or controller 115 for simplicity) can communicate with the memory devices 130, 140 to perform operations such as reading data, writing data, or erasing data at the memory devices 130, 140 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, and so forth. The local memory 119 can also include ROM for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and ECC operations, encryption operations, caching operations, and address translations between a logical address (e.g., LBA, namespace) and a physical memory address (e.g., physical block address) that are associated with the memory devices 130, 140. The memory sub-system controller 115 can further include host interface circuitry to communicate with the host system 120 via the physical host interface. The host interface circuitry can convert the commands received from the host system 120 into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130, 140.

In some embodiments, the memory device 130 includes local media controllers 135 that operate in conjunction with memory sub-system controller 115 to execute operations on one or more memory cells of the memory device 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local media controller 135) for media management within the same memory device package. An example of a managed memory device is a managed NAND (MNAND) device.

The memory sub-system controller 115 includes a block read-verify failure handler with zone support 113 (hereafter, the block read-verify failure handler 113) that enables or facilitates block read-verify failure with respect to zones of the memory sub-system 110 in accordance with various embodiments described herein. Alternatively, some or all of the block read-verify failure handler 113 is included by the local media controller 135, thereby enabling the local media controller 135 to enable or facilitate block read-verify failure with respect to zones of the memory sub-system 110.

As described herein, FIG. 2A and FIG. 2B are block diagrams illustrating operations of an example block caching architecture (e.g., 3S/1Q architecture) on a zone-based memory sub-system, in accordance with some embodiments of the present disclosure.

FIG. 3A through FIG. 4B are flow diagrams of example methods 300, 400 of handling block read-verify failure on a memory sub-system that supports zones, in accordance with some embodiments of the present disclosure. Any of methods 300, 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, any one of methods 300, 400 is performed by the memory sub-system controller 115 of FIG. 1 based on the block read-verify failure handler 113. Additionally, or alternatively, for some embodiments, any one of methods 300, 400 is performed, at least in part, by the local media controller 135 of the memory device 130 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are used in every embodiment. Other process flows are possible.

Figure 3A:
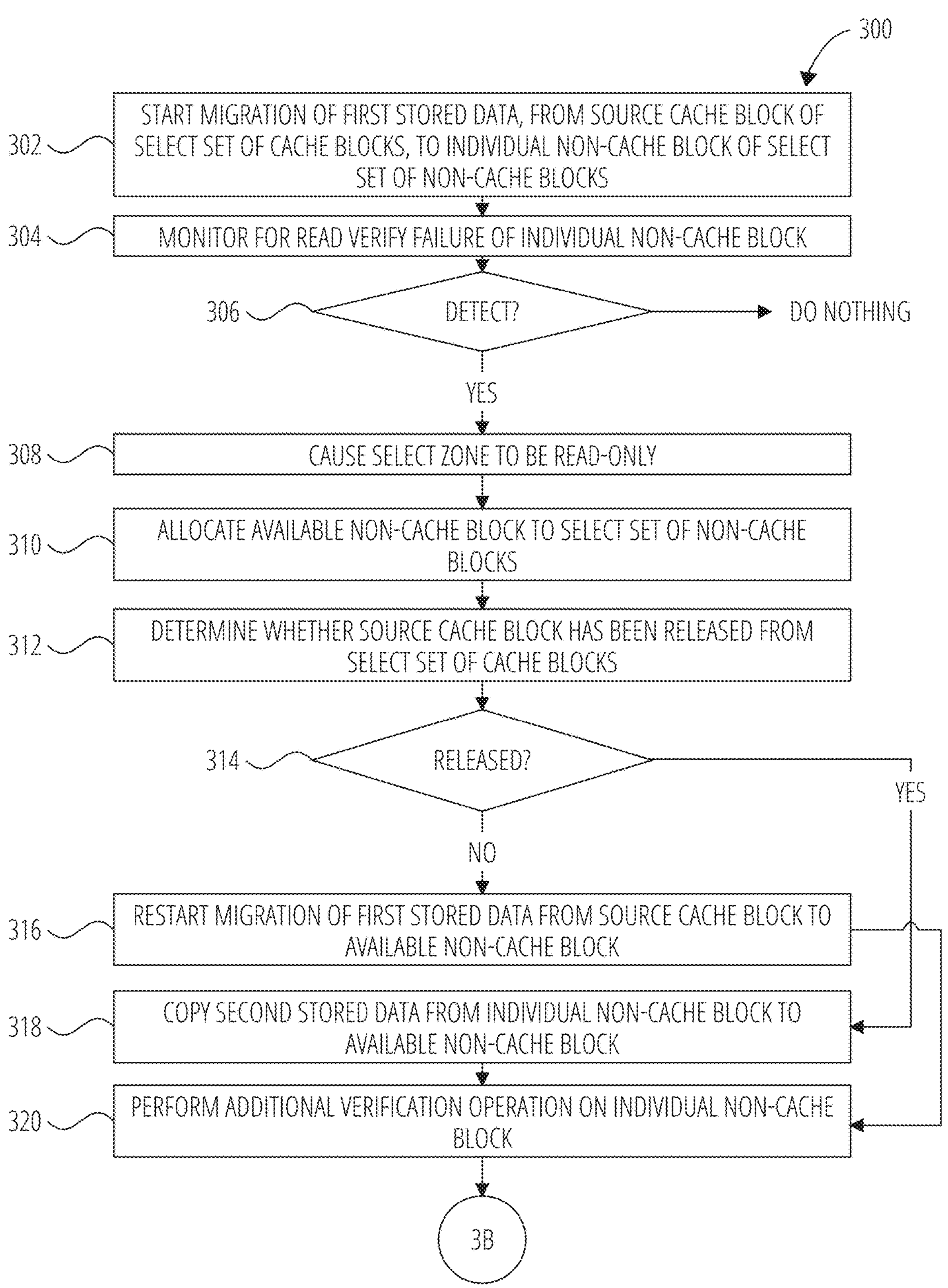
FIG. 3A through FIG. 4B are flow diagrams of example methods for handling block read-verify failure on a memory sub-system that supports zones, in accordance with some embodiments of the present disclosure.

Referring now to FIG. 3A, the method 300 illustrates an example method for handling block read-verify failure during a data migration from a cache block (e.g., SLC cache block) of a zone to a non-cache block (e.g., QLC non-cache block) of the zone on a memory sub-system that supports zones. At operation 302, a processing device (e.g., the processor 117 of the memory sub-system controller 115) starts migration of first stored data, from a source cache block of a select set of cache blocks of a select zone on a memory device (e.g., memory device 130), to an individual non-cache block of a select set of non-cache blocks of the select zone. For example, the select set of cache blocks can comprise one or more SLC cache blocks, such as one or more SLC blocksets, and the select set of non-cache blocks can comprise one or more QLC non-cache blocks, such as a single QLC blockset. The set of zones can be defined according to an NVMe specification.

While the migration is being performed, at operation 304, the processing device (e.g., the processor 117 of the memory sub-system controller 115) monitors (e.g., detects) for a read-verify failure of the individual non-cache block. At decision block 306, in response to the read-verify failure being detected by operation 304, the method 300 proceeds to operation 308. Alternatively, at decision block 306, in response to the read-verify failure not being detected by operation 304, the method 300 does nothing and the migration of data is assumed to have been completed without read-verify failure.

At operation 308, the processing device (e.g., the processor 117 of the memory sub-system controller 115) causes the select zone to be marked as read-only, and at operation 310, the processing device allocates an available non-cache block to the select set of non-cache blocks. Thereafter, at operation 312, the processing device determines whether the source cache block has been released from the select set of cache blocks. During decision block 314, in response to determining that the source cache block has not been released from the select set of cache blocks, the method 300 proceeds to operation 316. At operation 316, the processing device restarts the migration of the first stored data from the source cache block to the available non-cache block. Thereafter, the method 300 proceeds to operation 320.

Alternatively, at decision block 314, in response to determining that the source cache block has been released from the select set of cache blocks, the method 300 proceeds to operation 318. During operation 318, the processing device (e.g., the processor 117 of the memory sub-system controller 115) copies second stored data from the individual non-cache block to the available non-cache block. From operation 318, the method 300 proceeds to operation 320.

At operation 320, the processing device (e.g., the processor 117 of the memory sub-system controller 115) performs an additional verification operation on the individual non-cache block. For some embodiments, the additional verification operation comprises performing a decode process on a source page of the individual non-cache block, where a verification fail is indicated by the decode process failing (to decode the source page), and where a verification pass is indicated by the decode process passing (successfully decoding the source page). The decode process can comprise one of a 1H1S decode process or a 1H2S decode process, where 1H1S represents one hard bit-one soft bit information for each of the memory cells of a page and 1H2S represents one hard bit-two soft bit information for each of the memory cells of a page. For some embodiments, the additional verification operation comprises a read-verify operation similar to the one performed during the migration started by operation 302. After operation 320, the method 300 proceeds to decision block 322.

Figure 3B:
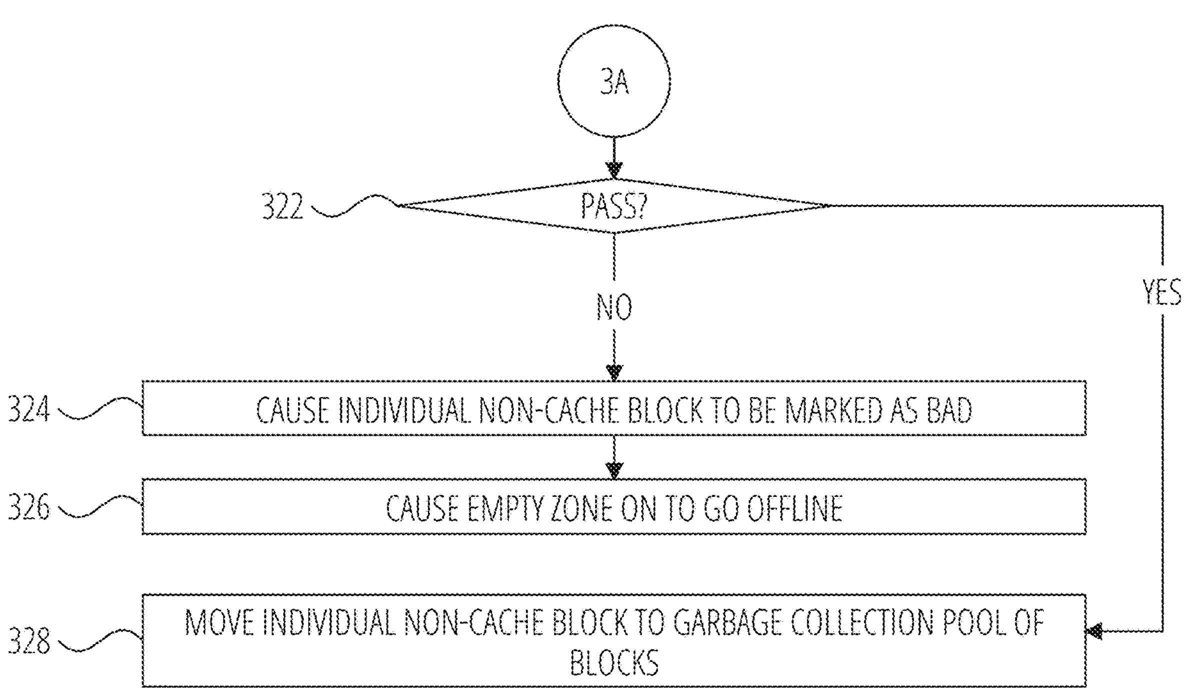

Referring now to FIG. 3B, at decision block 322, in response to the additional verification operation indicating a verification pass, the method 300 proceeds to operation 328, where the processing device (e.g., the processor 117 of the memory sub-system controller 115) moves the individual non-cache block to a garbage collection pool of blocks (to facilitate its reuse).

Alternatively, at decision block 322, in response to the additional verification operation indicating a verification fail, the method 300 proceeds to operation 324, where the processing device (e.g., the processor 117 of the memory sub-system controller 115) causes the individual non-cache block to be marked as bad (e.g., GBB). After causing the individual non-cache block to be marked as bad, at operation 326, the processing device causes an empty zone on the memory device to go offline.

Though the method 300 is described with respect to a migration of stored data from cache blocks to non-cache blocks, for some embodiments, the method 300 is adapted to be performed in connection another block operations, such as a refresh operation performed on a first, source non-cache block using a second, destination non-cache block.

Figure 4A:
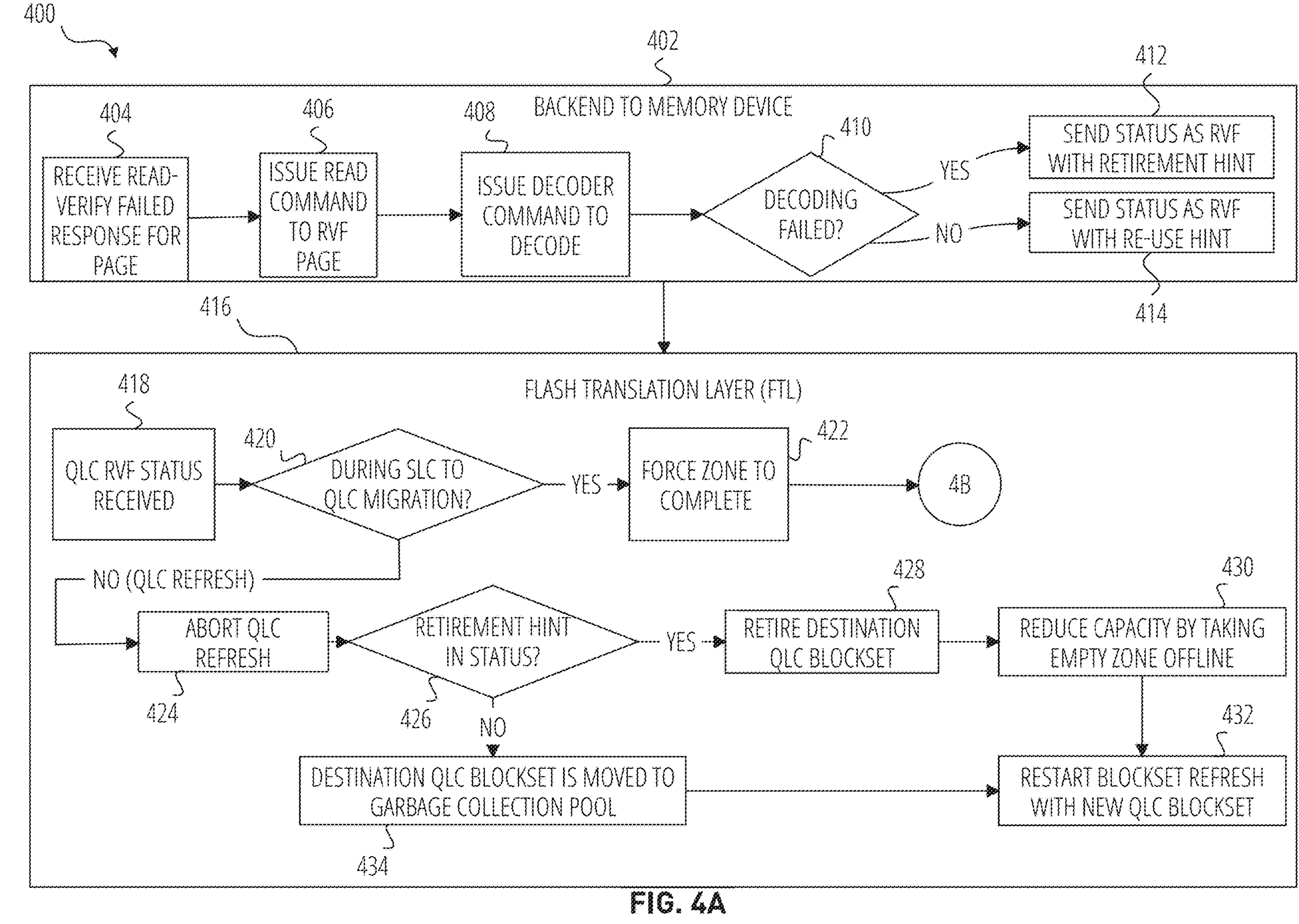

Referring now to FIG. 4A, the method 400 illustrates an example implementation of method 300 with respect to SLC cache blocks and QLC non-cache blocks of a memory sub-system that supports zones. As shown, the method 400 is implemented with respect to a backend to memory device 402 of a memory sub-system (e.g., 110) and a flash translation layer (FTL) 416 of the memory sub-system. At operation 404, the backend to memory device 402 receives (or detects) a read-verify failed response for a given page (hereafter, the read-verify failed (RVF) page) of a QLC non-cache block at operation 404. At operation 406, the backend to memory device 402 issues a read command to the RVF page, and then, at operation 408, the backend to memory device 402 issues a decoder command to decode the RVG page. At decision block 410, in response to the decoding failing, the method 400 proceeds to operation 412, otherwise the method 400 proceeds to operation 414. At operation 412, the backend to memory device 402 sends a status for the QLC block as RVF with a retirement hint. For some embodiments, the RVF status with a retirement hint is an indication or a suggestion to the FTL 416 that the FTL 416 should retire the QLC block. Alternatively, at operation 414, the backend to memory device 402 sends a status for the QLC block as RVF with a re-use hint. For some embodiments, the RVF status with a re-use hint is an indication or a suggestion to the FTL 416 that the FTL 416 should enable the re-use of the QLC block.

The FTL 416 receives the RVF status of the QLC block (hereafter, QLC RVF status) for the QLC block from the backend to memory device 402 (at operation 418). At decision block 420, in response to determining that the QLC RVF status is being received during a SLC to QLC migration, the method 400 proceeds to decision block 426, otherwise the method 400 proceeds to operation 424, where it is assumed the QLC RVF status is being received during a QLC refresh process being performed on the QLC block.

At operation 424, the FTL 416 aborts the QLC refresh operation. Afterward, at decision block 426, in response to the QLC RVF status including a retirement hint, the method 400 proceeds to operation 428, otherwise the method 400 proceeds to operation 434. At operation 428, the FTL 416 retires a destination QLC blockset that includes the QLC block (to prevent its reuse) and, at operation 430, the FTL 416 reduces the QLC block capacity of the memory device by taking an empty zone offline. After operation 430, at operation 432, the FTL 416 restarts a refresh process of the source QLC blockset (of the refresh process) with a new, available QLC blockset.

Alternatively, at operation 434, the FTL 416 moves a destination QLC blockset that includes the QLC block to a garbage collection pool. By moving (e.g., adding) the destination QLC blockset to the garbage collection pool, the destination QLC blockset can be processed by a garbage collection process (e.g., of the memory sub-system) and reused (e.g., for another purpose). After operation 434, the method 400 proceeds to operation 432, where the FTL 416 restarts a refresh process of the source QLC blockset (of the refresh process) with a new, available QLC blockset.

Figure 4B:
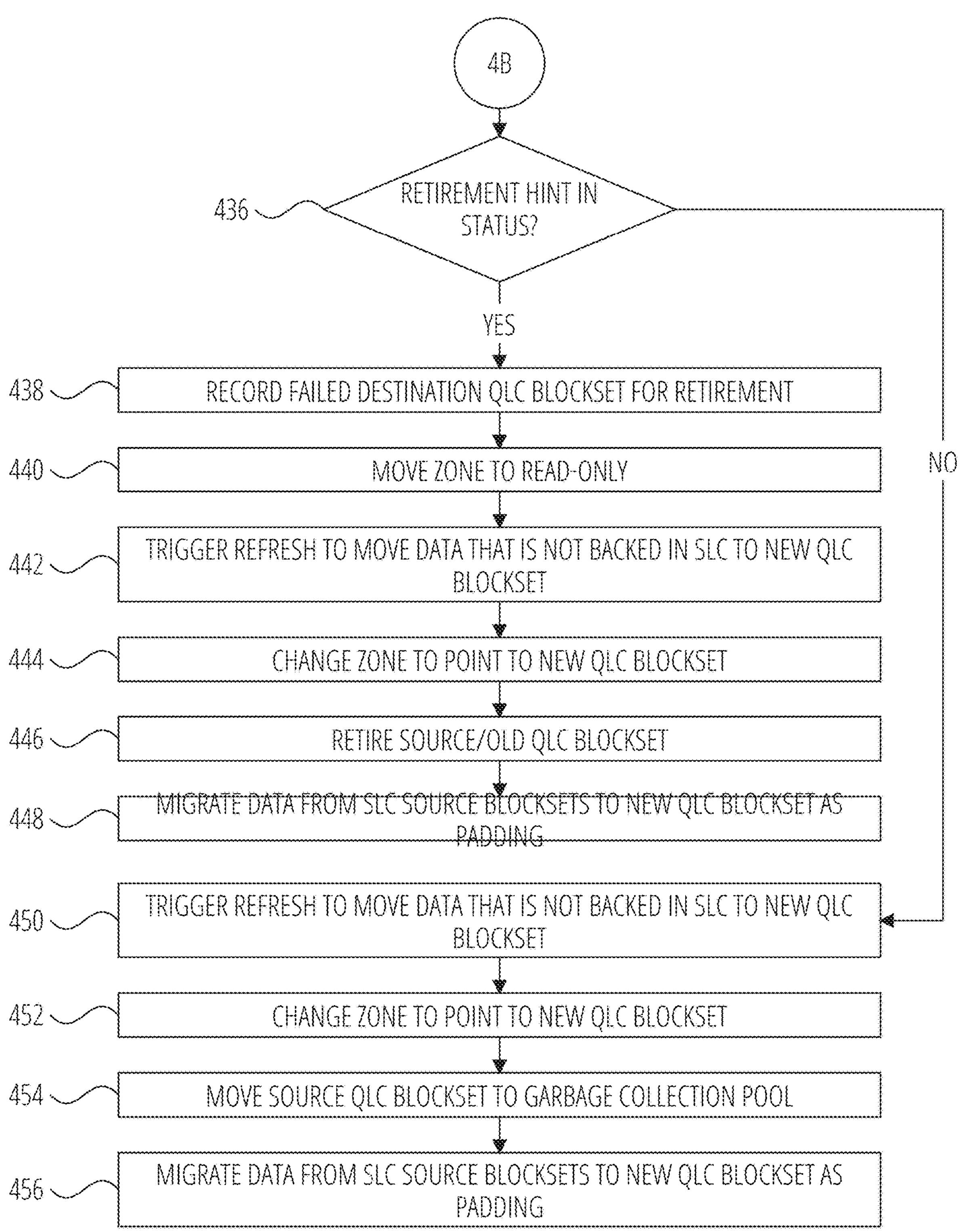

At operation 422, the FTL 416 forces a zone associated the QLC block to be complete. Thereafter, the method 400 proceeds to decision block 436. Referring now to FIG. 4B, at decision block 436, in response to the QLC RVF status including a retirement hint, the method 400 proceeds operation 438, otherwise the method 400 proceeds to operation 450. At operation 438, the FTL 416 records a (failed) destination QLC blockset that includes the QLC block for retirement and, at operation 440, the FTL 416 moves the zone to a read-only state. Thereafter, at operation 442, the FTL 416 triggers a refresh process to move data that is not backed in SLC blockset of the zone to a new QLC blockset. The FTL 416 then changes the zone to point to the new QLC blockset at operation 444, and retires the source (old) QLC blockset at 446. Eventually, at operation 448, the FTL 416 migrates data from SLC source blocksets to the new QLC blockset as padding.

During operation 450, the FTL 416 triggers a refresh process to move data that is not backed in SLC blockset of the zone to a new QLC blockset. Then, at operation 452, the FTL 416 changes the zone to point to the new QLC blockset. Thereafter, at operation 454, the FTL 416 moves a source QLC blockset to a garbage collection pool. By moving (e.g., adding) the source QLC blockset to the garbage collection pool, the source QLC blockset can be processed by a garbage collection process (e.g., of the memory sub-system) and reused (e.g., for another purpose). Eventually, at operation 456, the FTL 416 migrates data from SLC source blocksets to the new QLC blockset as padding.

Figure 5:
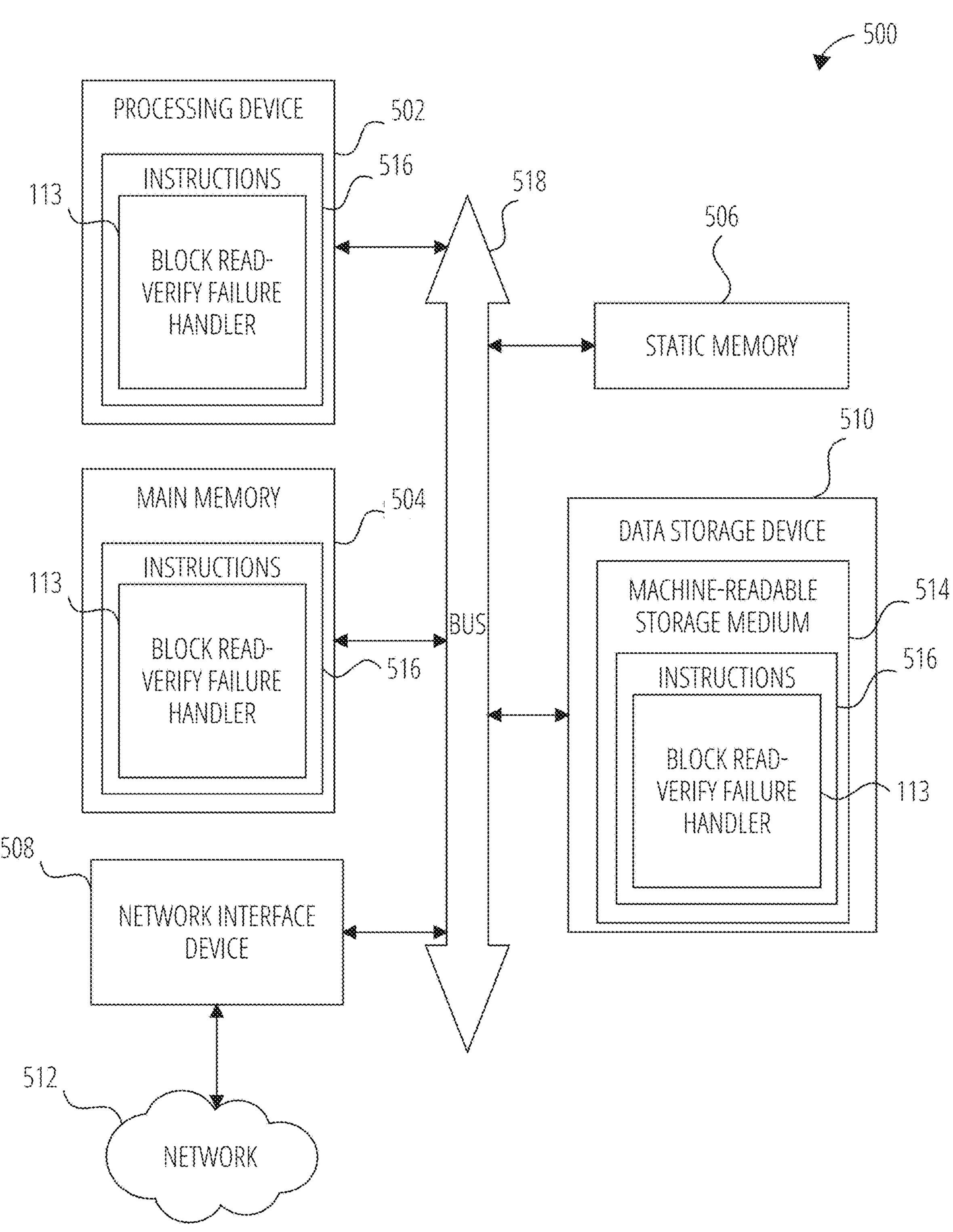
FIG. 5 is a block diagram of an example computer system in which embodiments of the present disclosure may operate.

FIG. 5 illustrates an example machine in the form of a computer system 500 within which a set of instructions can be executed for causing the machine to perform any one or more of the methodologies discussed herein. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations described herein. In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., ROM, flash memory, DRAM such as SDRAM or Rambus DRAM (RDRAM), etc.), a static memory 506 (e.g., flash memory, static random access memory (SRAM), etc.), and a data storage device 510, which communicate with each other via a bus 518.

The processing device 502 represents one or more general-purpose processing devices such as a microprocessor, a central processing unit, or the like. More particularly, the processing device 502 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 502 can also be one or more special-purpose processing devices such as an application-specific integrated circuit (ASIC), a field programmable gate array (FPGA), a digital signal processor (DSP), a network processor, or the like. The processing device 502 is configured to execute instructions 516 for performing the operations and steps discussed herein. The computer system 500 can further include a network interface device 508 to communicate over a network 512.

The data storage device 510 can include a machine-readable storage medium 514 (also known as a computer-readable medium) on which is stored one or more sets of instructions 516 or software embodying any one or more of the methodologies or functions described herein. The instructions 516 can also reside, completely or at least partially, within the main memory 504 and/or within the processing device 502 during execution thereof by the computer system 500, the main memory 504 and the processing device 502 also constituting machine-readable storage media. The machine-readable storage medium 514, data storage device 510, and/or main memory 504 can correspond to the memory sub-system 110 of FIG. 1.

In one embodiment, the instructions 516 include instructions to implement functionality corresponding to providing block failure protection for a zone memory sub-system as described herein (e.g., the block read-verify failure handler 113 of FIG. 1). While the machine-readable storage medium 514 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Described implementations of the subject matter can include one or more features, alone or in combination as illustrated below by way of examples.

Example 1 is a system comprising: a memory device comprising a set of zones for storing data, a select zone of the set of zones comprising a select set of cache blocks and a select set of non-cache blocks; and a processing device, operatively coupled to the memory device, configured to perform operations comprising: starting migration of stored data, from a source cache block of the select set of cache blocks, to an individual non-cache block of the select set of non-cache blocks; and while the migration is being performed: monitoring for a read-verify failure of the individual non-cache block; and in response to detecting the read-verify failure of the individual non-cache block: causing the select zone to be read-only; allocating an available non-cache block to the select set of non-cache blocks; determining whether the source cache block has been released from the select set of cache blocks; and in response to determining that the source cache block has not been released from the select set of cache blocks, restarting the migration of the stored data from the source cache block to the available non-cache block.

In Example 2, the subject matter of Example 1 includes, wherein the stored data is first stored data, and wherein the operations comprise: in response to determining that the source cache block has been released from the select set of cache blocks, copying second stored data from the individual non-cache block to the available non-cache block.

In Example 3, the subject matter of Examples 1-2 includes, wherein the operations comprise: performing an additional verification operation on the individual non-cache block; and in response to the additional verification operation indicating a verification fail, causing the individual non-cache block to be marked as bad.

In Example 4, the subject matter of Example 3 includes, wherein the additional verification operation comprises performing a decode process on a source page of the individual non-cache block, and wherein the verification fail is indicated in response to the decode process failing.

In Example 5, the subject matter of Example 4 includes, S decode process.

In Example 6, the subject matter of Examples 3-5 includes, wherein the operations comprise: in response to detecting the read-verify failure of the individual non-cache block, after causing of the individual non-cache block to be marked as bad: causing an empty zone on the memory device to go offline.

In Example 7, the subject matter of Examples 1-6 includes, wherein the operations comprise: performing an additional verification operation on the individual non-cache block; and in response to the additional verification operation indicating a verification pass, moving the individual non-cache block to a garbage collection pool of blocks.

In Example 8, the subject matter of Example 7 includes, wherein the additional verification operation comprises performing a decode process on a source page of the individual non-cache block, and wherein the verification pass is indicated in response to the decode process passing.

In Example 9, the subject matter of Example 8 includes, S decode process.

In Example 10, the subject matter of Examples 1-9 includes, wherein the select set of cache blocks comprises one or more single-level cell (SLC) blocks.

In Example 11, the subject matter of Examples 1-10 includes, wherein the select set of non-cache blocks comprises one or more quad-level cell (QLC) blocks.

Example 12 is a method to implement any of Examples 1-11.

Example 13 is at least one machine-readable medium comprising instructions that, when executed by a processing device, cause the processing device to perform operations to implement any of Examples 1-11.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks, ROMs, RAMs, EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a ROM, RAM, magnetic disk storage media, optical storage media, flash memory components, and so forth.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

The invention claimed is:

1. A system comprising:

a memory device comprising a set of zones for storing data, a select zone of the set of zones comprising a select set of cache blocks and a select set of non-cache blocks; and a processing device, operatively coupled to the memory device, configured to perform operations comprising:

starting migration of stored data, from a source cache block of the select set of cache blocks, to an individual non-cache block of the select set of non-cache blocks; and while the migration is being performed:

monitoring for a read-verify failure of the individual non-cache block; and in response to detecting the read-verify failure of the individual non-cache block:

causing the select zone to be read-only;

allocating an available non-cache block to the select set of non-cache blocks;

determining whether the source cache block has been released from the select set of cache blocks; and in response to determining that the source cache block has not been released from the select set of cache blocks, restarting the migration of the stored data from the source cache block to the available non-cache block.

2. The system of claim 1, wherein the stored data is first stored data, and wherein the operations comprise:

in response to determining that the source cache block has been released from the select set of cache blocks, copying second stored data from the individual non-cache block to the available non-cache block.

3. The system of claim 1, wherein the operations comprise:

performing an additional verification operation on the individual non-cache block; and in response to the additional verification operation indicating a verification fail, causing the individual non-cache block to be marked as bad.

4. The system of claim 3, wherein the additional verification operation comprises performing a decode process on a source page of the individual non-cache block, and wherein the verification fail is indicated in response to the decode process failing.

5. The system of claim 4, wherein the decode process comprises one of a 1H1S decode process or a 1H2S decode process.

6. The system of claim 3, wherein the operations comprise:

in response to detecting the read-verify failure of the individual non-cache block, after causing of the individual non-cache block to be marked as bad:

causing an empty zone on the memory device to go offline.

7. The system of claim 1, wherein the operations comprise:

performing an additional verification operation on the individual non-cache block; and in response to the additional verification operation indicating a verification pass, moving the individual non-cache block to a garbage collection pool of blocks.

8. The system of claim 7, wherein the additional verification operation comprises performing a decode process on a source page of the individual non-cache block, and wherein the verification pass is indicated in response to the decode process passing.

9. The system of claim 8, wherein the decode process comprises one of a 1H1S decode process or a 1H2S decode process.

10. The system of claim 1, wherein the select set of cache blocks comprises one or more single-level cell (SLC) blocks.

11. The system of claim 1, wherein the select set of non-cache blocks comprises one or more quad-level cell (QLC) blocks.

12. At least one non-transitory machine-readable storage medium comprising instructions that, when executed by a processing device, cause the processing device to perform operations comprising:

starting migration of stored data, from a source cache block of a select set of cache blocks of a select zone of a memory device, to an individual non-cache block of a select set of non-cache blocks of the select zone; and while the migration is being performed:

monitoring for a read-verify failure of the individual non-cache block; and in response to detecting the read-verify failure of the individual non-cache block:

causing the select zone to be read-only;

allocating an available non-cache block to the select set of non-cache blocks;

determining whether the source cache block has been released from the select set of cache blocks; and in response to determining that the source cache block has not been released from the select set of cache blocks, restarting the migration of the stored data from the source cache block to the available non-cache block.

13. The non-transitory machine-readable storage medium of claim 12, wherein the stored data is first stored data, and wherein the operations comprise:

in response to determining that the source cache block has been released from the select set of cache blocks, copying second stored data from the individual non-cache block to the available non-cache block.

14. The non-transitory machine-readable storage medium of claim 12, wherein the operations comprise:

performing an additional verification operation on the individual non-cache block;

in response to the additional verification operation indicating a verification fail, causing the individual non-cache block to be marked as bad.

15. The non-transitory machine-readable storage medium of claim 14, wherein the additional verification operation comprises performing a decode process on a source page of the individual non-cache block, and wherein the verification fail is indicated in response to the decode process failing.

16. The non-transitory machine-readable storage medium of claim 14, wherein the operations comprise:

in response to detecting the read-verify failure of the individual non-cache block, after causing of the individual non-cache block to be marked as bad:

causing an empty zone on the memory device to go offline.

17. The non-transitory machine-readable storage medium of claim 12, wherein the operations comprise:

performing an additional verification operation on the individual non-cache block;

in response to the additional verification operation indicating a verification pass, moving the individual non-cache block to a garbage collection pool of blocks.

18. The non-transitory machine-readable storage medium of claim 17, wherein the additional verification operation comprises performing a decode process on a source page of the individual non-cache block, and wherein the verification pass is indicated in response to the decode process passing.

19. The non-transitory machine-readable storage medium of claim 12, wherein the select set of cache blocks comprises one or more single-level cell (SLC) blocks, and wherein the select set of non-cache blocks comprises one or more quad-level cell (QLC) blocks.

20. A method comprising:

starting migration of stored data, from a source cache block of a select set of cache blocks of a select zone of a memory device, to an individual non-cache block of a select set of non-cache blocks of the select zone; and while the migration is being performed:

monitoring for a read-verify failure of the individual non-cache block; and in response to detecting the read-verify failure of the individual non-cache block:

causing the select zone to be read-only;

allocating an available non-cache block to the select set of non-cache blocks;

determining whether the source cache block has been released from the select set of cache blocks; and in response to determining that the source cache block has not been released from the select set of cache blocks, restarting the migration of the stored data from the source cache block to the available non-cache block.

* * * * *